UNITED STATES PATENT OFFICE.

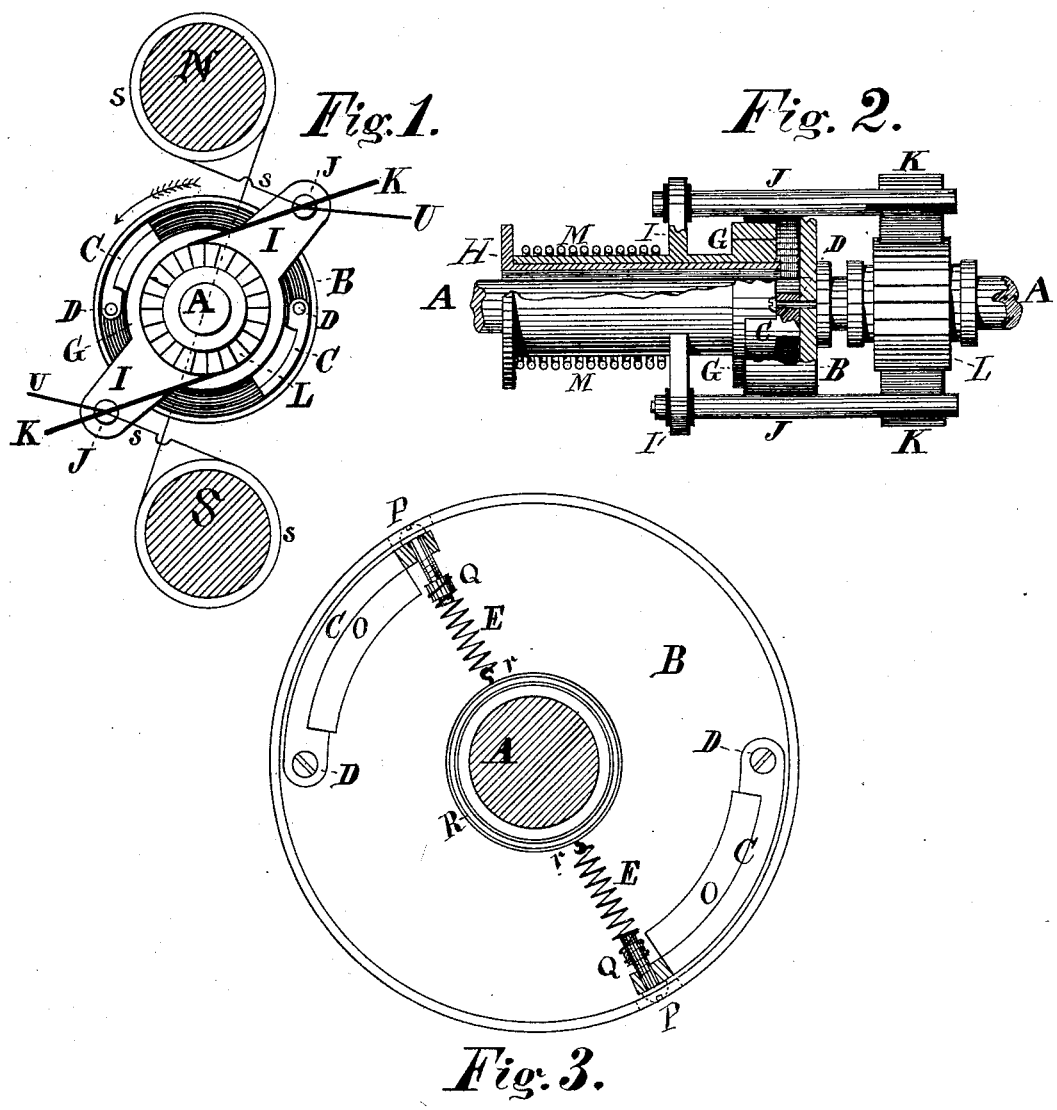

NATHANIEL SHEPARD KEITH, OF SAN FRANCISCO, CALIFORNIA.

REGULATOR FOR ELECTRIC MOTORS.

SPECIFICATION forming part of Letters Patent No. 416,169, dated December 3, 1889.

Application filed December 24, 1888. Serial No. 294,476. (No model.)

*To all whom it may concern:*

Be it known that I, NATHANIEL SHEPARD KEITH, a citizen of the United States, and a resident of San Francisco, in the county of San Francisco and State of California, have invented certain new and useful Improvements in Electric Motors, of which the following is a specification.

My invention consists in so constituting a dynamo-electric machine, when used as an electric motor, that it may be placed in series with one or more electric motors of the same or other kind upon a circuit supplied with an approximately constant current in ampères, and run at an approximately constant speed with the maximum of efficiency.

Parts of my invention may also be used on electric motors otherwise constituted, as is hereinafter more fully set forth.

It is well known that the torque (the turning moment) of an electric motor is dependent in a great measure, other things being equal, upon the magnetic strength of its field-magnet—if it be strong, the motor is strong; if it be weak, the motor is weak. The government of the speed of motors under varying loads has been accomplished more or less imperfectly by varying in many ways the strength of magnetism of their field-magnets.

It is well-known that the true line of commutation on the commutator of a dynamo-electric machine shifts with variations in the relative strengths of magnetism of its armature and field-magnets. If the field-magnet be extremely strong, the true line of commutation is nearly coincident with a plane midway between the poles of its field-magnet; but if the field-magnet be weaker the true line of commutation is moved in the direction toward a position at right angles thereto. If the field-magnet be extremely weak, the true line of commutation is nearly coincident with a line drawn at right angles to a plane situated midway between the poles of its field-magnet. In the case of a dynamo-electric machine used as a generator of electricity, on weakening the field-magnet the true line of commutation moves in the direction of the rotation of its armature. I have demonstrated in practice that in the case of a dynamo-electric machine used as an electric motor, on weakening the field-magnet the true line of commutation moves reversely to the direction of the rotation of its armature.

The maximum torque of an elecrtic motor is exerted when the brushes bear upon the commutator on the line coexistent with a plane midway between the poles of its field-magnet. If the brushes be moved from that line on the circumferential plane of the commutator, the torque will be less as the movement progresses, until when they are on the line coexistent with a line drawn at right angles to a plane situated midway between the poles of its field-magnets it will entirely cease.

The torque of a series-wound electric motor has been varied to accord with the mechanical resistance which it overcame, in order to keep its speed of rotation as nearly uniform as possible, by varying the position of contact of its brushes on its commutator. This is a wasteful way, because the electric resistance of the motor remains the same, and under small loads the energy used in overcoming this resistance is a very large percentage of the total energy given to the motor. It is also destructive of brushes and commutator, by reason of the excessive sparking at their points of contact, due to these points being away from the true line of commutation.

The torque of a series-wound electric motor has been varied to accord with the mechanical resistance which it overcame, in order to keep its speed of rotation as nearly uniform as possible by varying the ampère-turns of its field-magnet in several ways. When this has been done by automatic means, the brushes have not been moved to the position which accords with the line of commutation due to the changed magnetism of the field-magnets; therefore injurious sparking at commutator-brush contacts took place.

By this my invention I provide means whereby some of these hereinbefore-stated facts are practically and advantageously made use of and the stated defects avoided in constructing an electric motor which is highly efficient as a converter to mechanical power of the electric energy imparted to it, avoiding undue resistances and the use of energy to overcome them, as well as the waste, wear, and tear due to imperfect commutation, sparking, &c.

Shunt-wound electric motors have been used on circuits supplied with electricity at constant potential, but have been hitherto inapplicable to constant-current circuits from reasons of inability to govern their speed when on such circuits, general inefficiency, &c. By this my invention I put to use shunt-wound electric motors having qualities of high efficiency, perfect control of speed, and other desirable qualifications.

On the accompanying drawings, Figure 1 is an end view, perpendicular to the armature-shaft of an electric motor, of a device which I have used in carrying out my invention. Fig. 2 is a longitudinal sectional view of the same, and Fig. 3 is a detail showing more plainly and enlarged some of the parts.

Like letters of reference in each figure refer to like parts.

A is the shaft of a motor. Securely fastened to the shaft, so as to rotate with it, is the governor-drum B. In this drum are the governor-weights C C, which are pivoted at D D, so that they may swing thereon. These weights are drawn toward each other by the spiral springs E E. One end of each of the springs is fastened to the ring R, which spans the shaft A, Fig. 3. The other ends have nuts fastened to them, so that the screws P may be used in adjusting their tension. The weights C C press, by reason of the springs, on the periphery of the cylinder G. This cylinder is mounted on the boss H, so that it may easily rotate thereon and concentric with the shaft A. The cylinder has the arms I I, which carry the brush-holders J J, and which latter hold the brushes K K. The brushes impinge on the commutator, as usual. To the cylinder is attached the spiral spring M, which serves by its tension to move the cylinder and brushes in the reverse direction to the movement of the commutator.

The direction of rotation of the armature, commutator, shaft A, and drum B is shown by the arrow in Fig. 1. This movement causes the cylinder G to move in the same direction, by reason of the pressure of the weights C C on the periphery of the cylinder G, until it comes against a stop, (not shown,) but fixed at a point at which the brushes are caused to bear on the commutator on the line coexistent with a plane situated midway between the poles of its field-magnet. If the weights C C do not bear on the cylinder G, then the spring M will either retain the cylinder in the position at which the brushes will bear on the commutator on the line drawn at right angles to the plane midway between the poles, or will return it to that position if it has before been moved from it. When the motor starts, the brushes will be moved forward to the stop; but as soon as it has acquired sufficient velocity the weights C C will, from centrifugal force, move slightly away from the cylinder G, so that the spring M may pull the cylinder, arms I I, and brushes K K backward until the position and speed are attained at which the tension of the spring is exactly balanced by the friction of the weights on the cylinder. This will be when the centrifugal force due to the velocity is just sufficient to decrease the pressure of the weights on the cylinder enough to reduce their frictional contacts therewith to the point at which it balances the tension of the spring. I prefer to cover the cylinder where the weights impinge on it with leather or like material which will hold oil as a lubricant. I prefer to make the weights C C of steel, phosphor-bronze, or like hard material, or to face them with shoes O O, Fig. 3, which can be readily replaced from time to time, as needed. The lubricated leather and metal surfaces last a long time without renewal.

It is evident that a slight reduction in the speed of rotation of the motor's armature-shaft will cause the weights to grip the cylinder more tightly and carry the brushes forward, while a slight increase will cause them to loosen their grip somewhat, so that the spring will carry the brushes backward.

Heretofore it has been the practice in regulating the speed of an electric motor to move its brushes from the neutral line in the direction of the rotation of its armature to decrease the speed or torque, or both; and toward the line in the opposite direction to increase the speed or torque, or both. By my invention I move the brushes from the same line and to it, but in contrary directions, for like governing effects, because I have found that to be in practice the true way to avoid undue sparking at the commutator—that is to say, when the speed increases, the governing device moves the brushes in the direction from the neutral line, but opposite to the direction of rotation of the armature of the motor, and when the speed decreases the governing device moves the brushes toward the neutral line in the same direction as the rotation of the armature. This is done because in an electric motor the distortion of the lines of force of the field-magnet is in the reverse direction from that of an electric generator.

I prefer to wind the field-magnet of my motor with fine wire and connect it after the plan of a shunt-wound dynamo. In an electric motor under motion, when the brushes bear on the commutator on the plane midway between the poles of its field-magnet, the difference of potential of the brushes is at its maximum. When they bear on the commutator on the line at right angles to the plane, the difference of potential of the brushes is at its minimum. At all positions of the brushes between these two just named the difference of potential is more than when at the latter and less than when at the former, somewhat in proportion to the distance at which the brushes are from these lines. It is evident, then, that with a shunt-wound motor whose field-magnet coils are derived at the brushes the position of the brushes when the armature is in motion must determine the ampères of current which flow in the magnet-coils, and therefore the strength of the field-magnet. My device just described varies the position of the brushes on the commutator to cause enough electric current to be diverted through the field-magnet coils to make the field-magnet strong enough to insure torque enough to the armature to cause it to rotate at approximately a constant speed under all variations of the load on the motor within its capacity for work. When the motor is doing the minimum of work, the brushes will have the positions of least difference of potential, the minimum of current will be diverted through the field-magnet coils, and the field-magnet will consequently be very weak. When it is doing the maximum of work, the brushes will be at the positions of greatest difference of potential, the maximum current will be diverted through the field-magnet coils, and the field-magnet will be very strong. The energy absorbed (represented by the ohms law formula, $C_2R$) by the field-magnet coils is in proportion to the work done by the motor. Therefore the efficiency of the field-magnet is always at the maximum. Furthermore, the brushes take continually the positions coexistent with the then existent true line of commutation, because their proper positions under varying loads and the positions they should have under the distortion of the magnetic lines of force from varying relations of magnetic strengths of armature and field are coincident. Therefore there is little or no sparking, such as is so troublesome and destructive when the brushes are moved in the speed-government of other motors, especially such as are series-wound.

It is evident that my speed-governing device may be applied to motors of other constructions whenever it is desirable to control for constancy the speed of rotation of their armatures by moving the brushes to and from on the circumferential plane of their commutators.

The movement of brushes in the direction from the plane midway between the poles and reversely to the direction of rotation of its armature, to decrease torque, speed, or both, is applicable to series-wound motors for their government.

Having described my invention, I claim—

In an electric motor, a governor of its speed, which consists of the following parts: a rotary disk or drum, gripping-weights on the disk or drum and movable radially to and from, in obedience to centrifugal and centripetal forces, a rotatable cylinder concentric with the periphery of the disk or drum and gripped by the gripping-weights more or less tightly under variations in the speed of rotation of the disk or drum, brushes impinging or bearing on the commutator of the electric motor and attached to the rotatable cylinder, and a spring or counter-balance attached to the rotatable cylinder and opposing the rotation of the rotatable cylinder by the gripping-weights.

Signed at San Francisco, in the county of San Francisco and State of California.

NATHANIEL SHEPARD KEITH.

Witnesses:
H. J. HYLAND,
E. STEVENS.